US012561550B2

(12) United States Patent
Kranski et al.

(10) Patent No.: US 12,561,550 B2
(45) Date of Patent: Feb. 24, 2026

(54) TELEOPERATION FOR TRAINING OF ROBOTS USING MACHINE LEARNING

(71) Applicant: Sanctuary Cognitive Systems Corporation, Vancouver (CA)

(72) Inventors: Jeff Kranski, Campbell, CA (US); Carolyn Wales, Campbell, CA (US); Chris Cianci, Campbell, CA (US); Adrian Kaehler, Campbell, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 667 days.

(21) Appl. No.: 18/092,256

(22) Filed: Dec. 31, 2022

(65) Prior Publication Data

US 2023/0148120 A1     May 11, 2023

Related U.S. Application Data

(63) Continuation of application No. 17/474,413, filed on Sep. 14, 2021, now abandoned.

(51) Int. Cl.
*G06N 3/008*          (2023.01)
*G06N 20/00*          (2019.01)

(52) U.S. Cl.
CPC ............. *G06N 3/008* (2013.01); *G06N 20/00* (2019.01)

(58) Field of Classification Search
CPC ............................... G06N 3/008; G06N 20/00
USPC ......................................................... 706/14
See application file for complete search history.

(56) References Cited

U.S. PATENT DOCUMENTS

| | | | |
|---|---|---|---|
| 2021/0081752 A1 | 3/2021 | Chao et al. | |
| 2021/0252698 A1 | 8/2021 | Paxton et al. | |
| 2021/0253128 A1 | 8/2021 | Nister et al. | |
| 2021/0357782 A1 | 11/2021 | Graves et al. | |
| 2021/0362332 A1* | 11/2021 | Kolluri | B25J 9/163 |
| 2021/0387330 A1 | 12/2021 | Mavrin et al. | |
| 2022/0016766 A1 | 1/2022 | Humayun et al. | |
| 2022/0035973 A1 | 2/2022 | Liebman et al. | |
| 2022/0051138 A1 | 2/2022 | Stoll et al. | |
| 2022/0084272 A1 | 3/2022 | Wang et al. | |

(Continued)

OTHER PUBLICATIONS

Nguyen-Tuong, et al., "Model learning for robot control: a survey", Cogn Process (2011) 12:319-340, 2011 (Year: 2011).*

(Continued)

*Primary Examiner* — Tsu-Chang Lee
(74) *Attorney, Agent, or Firm* — Adenike Adebiyi; Thomas Mahon

(57)          ABSTRACT

Methods and systems for using a teleoperation system to train a robot to perform tasks using machine learning are described herein. A teleoperation system may be used to record actions of a robot as used by a human teleoperator. The teleoperation system may provide a teleoperator insight into the state of the robot and may provide feedback to the teleoperator allowing the teleoperator to feel what the robot is feeling. For example, sensor information from the robot may be sent to the teleoperation system and output to the teleoperator in various forms including vibrations, video, visual cues, or sound. The teleoperation system may output visual guides to the teleoperator so that the teleoperator may know how to control the robot to complete a task in a desired manner.

20 Claims, 6 Drawing Sheets

*200*

(56) References Cited

U.S. PATENT DOCUMENTS

2022/0101627 A1   3/2022   Pappas et al.

OTHER PUBLICATIONS

Internet Archive of "Transfer Learning," Wikipedia, https://web.archive.org/web/20210331015532/https://en.wikipedia.org/wiki/Transfer_learning, Mar. 31, 2021, pp. 1-5.

* cited by examiner

100

Server
106

Robot System
102

Communication Subsystem
112

Machine Learning
Subsystem
114

Sensors
116

Network
150

Teleoperation System
104

Display
142

Sensors
144

*300*

444

ML Model 442

446

TELEOPERATION FOR TRAINING OF ROBOTS USING MACHINE LEARNING

CROSS-REFERENCE TO RELATED APPLICATIONS

This application is a continuation of U.S. patent application Ser. No. 17/474,413, filed Sep. 14, 2021, the disclosure of which is incorporated herein by reference.

BACKGROUND

1. Field

The present disclosure relates generally to robotics and, more specifically, to machine-learning models for controlling robots.

2. Description of the Related Art

In recent years, robotics have been improved through the use of machine learning. For example, reinforcement learning has been applied to robots to help robots learn how to complete a task through many trial-and-error attempts of the task. Reinforcement learning may allow a robot to learn through reward mechanisms that reward the robot when a task is performed correctly and penalize the robot when a task is not performed correctly. Through repeated actions the robot is able to learn to perform actions that maximize the reward and avoid actions that lead to penalties or lower rewards.

SUMMARY

The following is a non-exhaustive listing of some aspects of the present techniques. These and other aspects are described in the following disclosure.

Some aspects include a process including: obtaining a plurality of records of one or more humans teleoperating one or more robots, the plurality of records including: outputs from sensors of the one or more robots indicative of states and environments of the one or more robots, and commands to the one or more robots, the commands may be generated based on teleoperation inputs obtained from humans upon being presented with the outputs; and training, with the computer system, a reinforcement-learning model on the plurality of records to mimic the commands to the one or more robots given new inputs from the sensors of the one or more robots. Some aspects further include re-training, with the computer system, the trained reinforcement-learning model to control a robot without teleoperation from humans; and storing, with the computer system, the re-trained reinforcement-learning model in memory.

Some aspects include a tangible non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
FIG. 1A shows an example teleoperation system for training a robot to perform tasks using machine learning, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the disclosure. It will be appreciated, however, by those of ordinary skill in the art, that the disclosed techniques may be practiced without these specific details or with an equivalent arrangement. To mitigate the problems described herein, the inventors had to both invent solutions and, in some cases just as importantly, recognize problems overlooked (or not yet foreseen) by others in the fields of teleoperation, robotics, and machine learning (e.g., reinforcement learning). Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Despite recent advances in robotics and machine learning, it is still difficult to train a robot to perform tasks. For example, some reinforcement learning models may require a vast number of trial-and-error attempts, which for robots may be difficult to complete due to time constraints. To improve the efficiency of training a robot, a human teleoperator may control the robot to perform the task that the robot is performing. The teleoperator's actions and the resulting sequence of states of the robot may be recorded and used as training data to help increase the speed at which the robot can learn to complete the task. However, controlling a robot in a precise manner such that the data can be stored and used to train the robot can be difficult. A teleoperator may be unable to properly detect the state of the robot, what the robot is doing, or what the robot is able to see. The teleoperator may be unaware of technical constraints or errors that the robot is experiencing, which may lead to unnecessary wear and tear of the robot.

To address these and other issues, a teleoperation system may be used to record actions of a robot as used by a human teleoperator. The teleoperation system may provide a teleoperator insight into the state of the robot and may provide feedback to the teleoperator allowing the teleoperator to feel what the robot is feeling. For example, sensor information from the robot may be sent to the teleoperation system and output to the teleoperator in various forms including vibrations, video, visual cues, or sound. The teleoperation system may output visual guides to the teleoperator so that the teleoperator may know how to control the robot to complete a task in a desired manner. This may enable the teleoperator to generate training data for the robot with less errors and allow the system to use less computing resources to collect training data because of the reduction in errors during performance of a task. Aspects described herein may also increase the efficiency of the robot because the teleoperator may be less likely to cause damage to the robot through improper use of the robot.

In some embodiments, data obtained during teleoperation (e.g., sensor data and responsive commands) may be used to train a machine-learning model used to control other autonomous robots. In some embodiments a resulting pre-trained reinforcement learning model (such as a policy implemented as a deep neural network, which may be a type of a Behaviorally Cloned policy) may be capable of controlling the robot without teleoperation from a human. Some implementations are expected to even be capable of having an acceptable success rate on the task exemplified in teleoperation, so long as initial conditions are sufficiently similar (e.g., near identical) to those used in training examples captured during teleoperation. Some embodiments may undergo further training to refine this policy to allow it to be more robust under a wider variation of starting positions/states.

A computing system may obtain records generated from teleoperating robots. The records may correspond to one or more tasks that the robots may learn to perform. For example, the records may include teleoperators controlling a robot to change a tire of a car wheel. In this example, the task may include actions such as removing lug nuts that attach the wheel to the car, removing the old tire from the wheel, and placing a new tire on the wheel. The records may include output from sensors of the teleoperated robots. Sensor output may indicate a state of a teleoperated robot or an environment surrounding the teleoperated robot. For example, the sensor output may indicate a sequence of positions of an arm and body of a robot as the robot removes a tire from the wheel. The records may include commands to the teleoperated robots that were generated based on the sensor outputs and based on inputs obtained from teleoperators. For example, the sensor output may include commands that cause the robot to move its arm in proximity to a lug nut on the wheel and commands that cause the robot to rotate the lug nut to loosen it from the wheel.

The computing system may assist the teleoperator in performing a task and may provide information about the robot. The computing system may output video from cameras of the robot and visual cues to a display (e.g., a virtual reality headset) of the teleoperator. For example, the computing system may display an arrow showing what direction the robot should move to locate new tires to place on the wheel. The computing system may output other feedback to improve control over the computing system. For example, the teleoperation system may output vibrations to a glove or other equipment of the teleoperator when an arm of the robot interacts with an object (e.g., when the robot grabs a new tire).

The computing system may use the records generated via the teleoperation system to pre-train one or more machine learning models so that the robot is more quickly able to learn actions performed by the robot while under control of a teleoperator. The computing system may continue to train the pre-trained one or more machine learning models to control the robot without teleoperation from humans. For example, the machine learning models may be used to continue attempting to change tires on car wheels and may further improve the robot's ability to perform the task (e.g., without being controlled by a teleoperator). The computing system may store the trained machine learning models in memory.

FIG. 1A shows an example computing system 100 for using machine learning to perform offline machine learning using training data from teleoperated robots. The computing system 100 may include a robot system 102, a teleoperation system 104, or a server 106. The robot system 102 may include a communication subsystem 112, a machine learning (ML) subsystem 114, and sensors 116.

The ML subsystem 114 may include a plurality of machine learning models. For example, the ML subsystem 114 may pipeline an encoder and a reinforcement learning model that are collectively trained with end-to-end learning, the encoder being operative to transform relatively high-dimensional outputs of a robot's sensor suite into lower-dimensional vector representations of each time slice in a latent embedding space, and the reinforcement learning model being configured to update setpoints for robot actuators based on those vectors. Some embodiments of the ML subsystem 14 may include an encoder model, a dynamic model, an actor-critic model, a reward model, an anomaly detection model, or a variety of other machine learning models (e.g., any model described in connection with FIG. 2 and FIG. 4 below, or ensembles thereof). One or more portions of the ML subsystem 114 may be implemented on the robot system 102, the server 106, or the teleoperation system 104. Although shown as distinct objects in FIG. 1A, functionality described below in connection with the robot system 102, the server 106, or the teleoperation system 104 may be performed by any one of the robot system 102, the server 106, or the teleoperation system 104. The robot system 102, the server 106, or the teleoperation system 104 may communicate with each other via the network 150.

The teleoperation system 104 may be used by a teleoperator to control the robot system 102 to perform tasks. Teleoperation via the teleoperation system 104 may include embodiments where the teleoperator and teleoperation system 104 is local to the robot system 102 (e.g., in the same environment or room as the robot system 102) or embodiments where the teleoperator and teleoperation system 104 is remote from the robot system 102 (e.g., in a different building, city, or other location). The teleoperation system 104 may include the teleoperation system 219 as described in connection with FIG. 2 below. The robot system 102 may include one or more cameras, joints, servomechanisms, or any other component or entire robots discussed in the specification and figures of U.S. patent application Ser. No. 16/918,999, filed 1 Jul. 2020, titled "Artificial Intelligence-Actuated Robot," which is incorporated herein by reference in its entirety.

The robot system 102 may obtain records generated from one or more humans teleoperating one or more robots (e.g., the records may correspond to one or more tasks that the robot may learn to perform). For example, the records may include commands input by teleoperators controlling a robot to perform some task, like change a tire of a car wheel (e.g., including actions such as removing lug nuts that attach the wheel to the car, removing the old tire from the wheel, and placing a new tire on the wheel). The records may include output from sensors of the teleoperated robots, e.g., from 2, 5, or 10 or more channels of timestamped sensor data. Sensor output may indicate a state of a teleoperated robot and an environment surrounding the teleoperated robot. For example, the sensor output may include images of the robot operating touch sensor feedback from arrays of force-resistive sensors, motor currents, three- or six-axis inertial-measurement readings from robot appendages, and the like. Sensor output may indicate a sequence of positions of an arm and body of a robot as the robot removes a tire from the wheel, for example. Sensor output may be filtered and still count as sensor output even if not in raw form, and the commands/outputs in "a record" can be reformatted, filtered, etc., and still count as "the record" in their modified format. The records may include timestamped commands to the teleoperated robots that were generated based on inputs obtained from teleoperators. In some cases, some of the commands may also be based on sensor outputs. For example, the sensor output may include commands that cause the robot to move its arm in proximity to a lug nut on the wheel and commands that cause the robot to rotate the lug nut to loosen it from the wheel.

The teleoperation system 104 may be used to generate the records and may improve a teleoperator's ability to control the robot system 102. In some cases, the records may include a plurality of time-slices, each time-slice having the sensor output or a latent embedding vector formed by the encoder to encode the sensor output (the vector itself also being an example of sensor output), and those time-slices may each be associated with one or more commands from the teleoperator, e.g., commands occurring concurrently in the same time slice, or in a different quantization of time shifted in phase, frequency, or both. For example, the teleoperation system 104 may assist the teleoperator in performing a task by providing information about the robot and the environment surrounding the robot. This may help a teleoperator to provide higher quality demonstrations (e.g., the expert demonstrations 221 discussed below in connection with FIG. 2) that may help one or more machine learning models to train more quickly or efficiently. That said, embodiments are not limited to systems that afford this benefit, which is not to suggest that any other description is limiting.

The teleoperation system 104 may assist the teleoperator by providing indications of limitations on movements that the robot system 102 may perform. A teleoperator may use the teleoperation system 104 to send a command to the robot system 102 to move (e.g., move an arm, leg, camera, head, tool, or other part of the robot system 102). The robot system 102 may attempt to make the movement, but if the movement is beyond a threshold (e.g., distance, angle, etc.) the robot system 102 may detect (e.g., via a sensor of the robot) that the no further movement in the direction is possible. The teleoperation system 104 may receive sensor output indicating that no further movement is possible in the direction (or sensor output indicating further movement may cause damage to the robot system 102). Based on the indication, the teleoperation system 104 may provide feedback to the teleoperator indicating that no further movement in the direction should be made. The feedback maybe made via haptic feedback (e.g., vibrations), sound from a speaker of the teleoperation system 104, or via a display 142 (e.g., a virtual reality display used by the teleoperator). For example, the teleoperator may send a command to raise an arm of the robot system 102. The command may cause the robot system 102 to raise the arm in a first direction. The robot system 102 or teleoperation system 104 may determine, via information received from a sensor of the arm of the robot, that the arm should not be moved further in the first direction (e.g., further movement may cause damage, or further movement is not physically possible, etc.). In response to determining that the arm should not be moved further in the first direction, the teleoperation system 104 may output feedback to the teleoperator.

The feedback may include displaying a notification on a display 142 (e.g., an augmented reality headset, a virtual reality headset worn by the teleoperator, a monitor, etc.). Outputting feedback to the teleoperator may include outputting vibrations to a device worn on a shoulder or other body part of the teleoperator. Outputting feedback to the teleoperator may include outputting vibrations to a control device operated by the teleoperator (e.g., a part of the teleoperation system 104). The robot system 102 may detect, via a component (e.g., an arm) of the robot system 102, contact with an object. In response to detecting contact with the object, the robot system 102 may send an indication that the component has contacted an object to the teleoperation system 104. In response to detecting contact with the object, the teleoperation system 104 may output feedback (e.g., haptic, audio, or visual feedback) to the teleoperator. For example, the feedback may include outputting vibrations via a glove that is worn by the teleoperator.

The robot system 102 may include one or more cameras that may be used to record the environment surrounding the robot system 102. The cameras may include one or more RGB cameras (e.g., with a complementary metal oxide semiconductor), one or more infrared cameras, one or more depth sensing cameras or a variety of other cameras. In some cases, the cameras are arranged in stereoscopic arrays, and some embodiments use structured light, time-of-flight, or LIDAR to sense depth. The teleoperation system 104 may output video or images obtained via cameras of the robot system 102 to a display 142 of the teleoperation system. The display 142 may include a virtual reality headset, an augmented reality display (e.g., augmented reality glasses), a screen, or a variety of other displays. The teleoperation system 104 may obtain video from the first robot or depth information associated with the video. The teleoperation system 104 may output the video on a display of a headset. For example, the teleoperation system 104 may output a first portion of the video to a left eye view of the display 142, and output a second portion of the video to a right eye view of the display 142 (e.g., for 3D viewing of the environment around the robot system 102). The teleoperation system 104 may overlay the depth information on video that is output to the display 142. The depth information may indicate how far away an object is from the robot system 102. For example, the teleoperation system 104 may receive video from a depth sensing camera and depth information corresponding to a table that is within view of the depth sensing camera. The teleoperation system 104 may output the depth information of the table (e.g., the distance between the table and the robot system 102) such that it is overlayed over the table's location on the display. Or in some cases, the teleoperator is located in the same physical space as the robot, and the teleoperator can view the robot's operations without aid of a display.

The teleoperation system 104 may output visual cues onto the display 142 to assist the teleoperator in controlling the robot system 102. The visual cues may indicate how a task should be performed. For example, the visual cues may indicate a location where an object should be placed, a trajectory that the robot system 102 should be moved in to perform a task correctly, or a variety of other information associated with a task. The teleoperation system 104 may obtain an indication of a task (e.g., a task identification) that the robot system 102 is to perform. The task identification may be input via the teleoperator or may be assigned via the server 106. The teleoperation system 104 may obtain first video from one or more cameras of the robot system 102. The teleoperation system 104 may generate a visual guide indicating a plurality of actions to perform to complete the task, and locations where each action of the plurality of actions should be performed. The teleoperation system 104 may output the visual guide onto the display 142 as an overlay over the video obtained from the robot system 102. In some embodiments, the visual guide may be generated using video of a previous successful completion of the task. For example, the teleoperation system 104 may use the video to determine one or more movements of the robot system 102 or movements of an object that is manipulated during completion of the task. The teleoperation system 104 may use computer vision techniques to generate, based on the video, a sequence of visual cues that show the movements of the robot system 102 or the movements of the object.

Figure 1B:
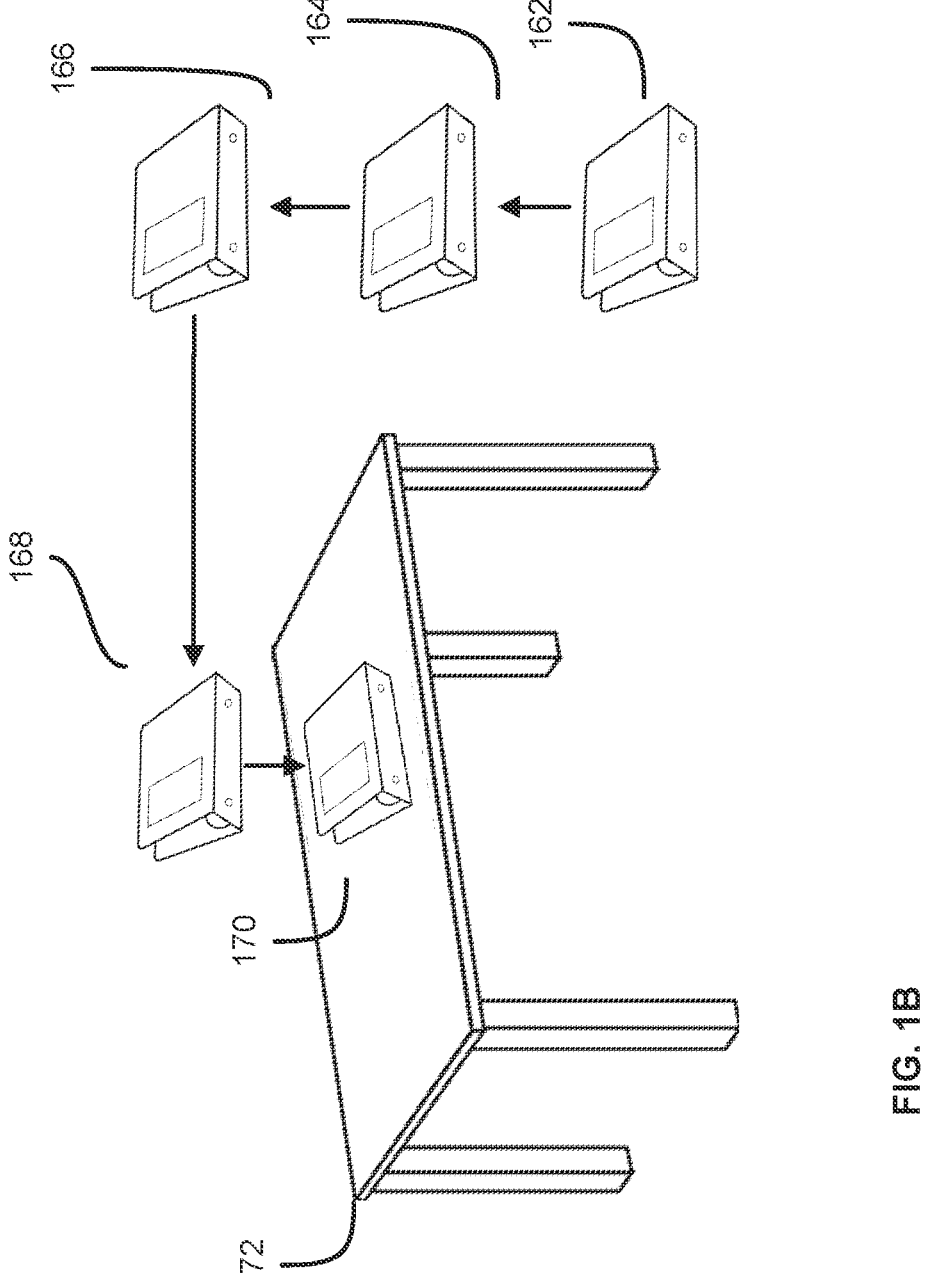
FIG. 1B shows an example visual guide that may be displayed to a teleoperator, in accordance with some embodiments.

For example, in FIG. 1B, example visual cues are shown. In this example, the robot system 102 may be tasked with picking up a book 162 and placing it on a table 172. The teleoperation system 104 may display visual cues 164-170 indicating how the book 162 should be moved and where the book 162 should be placed on the table 172. For example, the visual cue 164 includes a virtual representation of the book 162 and an arrow indicating that the book 162 should be moved upward. The virtual representation of the book may be an outline of the shape of the book, a partially transparent image of the book (e.g., a gradient may be used to fade an image to be transparent), a computer-generated icon, or a variety of other virtual representations. The visual cue 166 indicates that the book 162 should continue to be moved upward. The visual cue 168 indicates that the book 162 should be moved to the left over the table 172 and the visual cue 170 indicates the location that the book should be placed on the table 172. The teleoperation system 104 may show a portion of the visual cues before showing other visual cues. For example, the teleoperation system 104 may initially show the visual cue 164. After the robot system 102 has moved the book 162 to the position indicated by visual cue 164, the teleoperation system 104 may show the visual cue 166. After the book 162 has been moved to the position indicated by visual cue 166, the teleoperation system may show the visual cue 168, and so on.

The teleoperation system 104 may display visual cues that indicate the orientation an object should be in for completion of a task. The teleoperation system 104 may obtain task information that indicates an object for the robot system 102 to manipulate (e.g., move, adjust, modify, etc.). The teleoperation system 104 may use a machine learning model (e.g., a machine learning model described in FIG. 2 or FIG. 4 below) to identify an object in video (e.g., video received from the robot system 102) that should be manipulated. The teleoperation system 104 may determine, based on inputting the video into a machine learning model (e.g., a machine learning model described in FIG. 2 or FIG. 4 below) that has been trained on previous recordings showing performance of the task (e.g., video from an instance of robot system 102 showing the actions the instance performed to complete the task), that the object is not oriented correctly. In response to determining that the object is not oriented correctly, the teleoperation system 104 may output a visual cue (e.g., a transparent image of the object, a graphical icon, an arrow showing a direction to rotate the object, or a variety of other visual cues) to indicate a desired orientation of the object. The visual cue may be overlayed onto the video at a location indicating where the object should be moved to by the robot system 102. The overlay and the video may be output to the display 142.

The teleoperation system 104 may display data associated with the robot system 102 on the display 142. The data may be used by the teleoperator to determine whether the robot system 102 is functioning as intended, whether a portion of the robot system 102 is broken, etc. The data may include sensor data that indicates the position of one or more components of the robot system 102 (e.g., the position of an arm of the robot). The data may indicate the status of a motor or other sensor of the robot system 102 (e.g., whether the motor is working properly). The data may include an indication of internal temperature of the robot system 102, temperature of a motor of the robot system, or temperature of another component the robot. For example, the temperature (e.g., in Celsius or Fahrenheit) of a component of the robot system 102 may be output on the display (e.g., overlayed over video received from the robot system 102). The data may include a number of hours that the robot has been in use since the robot was last turned off. The data may be displayed, for example, in a corner of the display 142 or other location to not obstruct the video received from the robot system 102. The teleoperation system 104 may update the displayed data periodically (e.g., every second, every time the data changes, every time the robot system 102 moves, etc.). For example, the teleoperation system 104 may obtain video from a plurality of cameras of the robot and sensor information from the sensors 144. The teleoperation system may output the video overlayed with the sensor information to a display associated with a teleoperator of the first robot.

The teleoperation system 104 may be used to remove data that does not meet a threshold level of quality for training a machine learning model. For example, the robot system 102 may be controlled such that a desired action is not performed correctly and as a result, one or more recorded commands or other portions of a record may need to be adjusted or deleted. The teleoperation system 104 may need to be used to generate a new recording. The teleoperation system 104 may compare a new recording with a previous recording and determine that it does not match (e.g., within a threshold criteria) the previous recording. The teleoperation system 104 may determine to delete the new recording or prompt the teleoperator to redo the task/recording (e.g., repeat the task by controlling the robot system 102 to perform the task again).

In some embodiments, the teleoperation system 104 may keep recordings that are not correct (e.g., that do not satisfy a quality threshold for performance of a task) and use them to train a machine learning model of the computing system 100 (e.g., a machine learning model described in connection with FIG. 2 or FIG. 4). The teleoperation system 104 may receive input indicating movement for the robot to perform (e.g., the input may be a command entered by a teleoperator). The teleoperation system 104 may receive an indication that the input does not satisfy one or more criteria (e.g., the movement was incorrect, a mistake was made by the teleoperator). For example, the indication may be received from the teleoperator or from a machine learning model that compares the input with other input previously received by the tele operation system (e.g., based on other recordings from other teleoperators). The teleoperation system 104 may output an indication that the input or movement does not satisfy a criterion for movement of the robot system 102. In response to receiving the indication, the teleoperation system 104 may associate the first input with a negative reward in the reinforcement-learning model. The computing system may train one or more machine learning models based on the input, movement, or negative reward.

The computing system may use the records generated via the teleoperation system to pre-train one or more machine learning models so that the robot is better able to repeat or learn actions that were performed by the robot system 102 while the robot system 102 was under control of a teleoperator. Pre-training may explain the space of allowable trajectories to a machine learning model used by the robot system 102. Pre-training may allow the robot system 102 to learn to handle out-of-sample inputs/tasks, while being faster than random exploration or Q-learning. On the order of 200 teleoperated examples may bound the exploration space for learning during training after pre-training. The computing system 100 may pre-train the one or more machine learning models by determining associations between actions and rewards indicated in the plurality of records. The computing system 100 may adjust one or more weights or biases (or other parameters) of a machine learning model based on the determined associations. The weight adjustments may make the reinforcement learning model more likely to cause the robot system 102 to perform actions indicated in the teleoperation records. In some cases, pre-training may be referred to as "offline training," and the ML models to be trained may not be used (or simulated) when generating the training data used for pre-training. In some cases, the number of offline training examples is between 10 and 10,000, for example between 10 and 1,000, like between 50 and 500. In some embodiments, pretraining is performed without simulating or operating the robot. A task may include multiple actions. For example, putting a screw in place and tightening it might have multiple actions, and offline reinforcement learning may be used to train the robot system 102 to perform one task and then train the robot system 102 to learn another similar task with online reinforcement learning.

The computer system may continue to train the pre-trained one or more machine learning models to control the robot (e.g., based on actions determined via the one or more machine learning models after having been pre-trained by actions performed by teleoperators). In some cases, this training process may be referred to as online training, and the ML models to be trained from their pre-trained state may be executed on real or simulated operation of the robot to further refine their parameters. In some cases, one, two, or three or more orders of magnitude of iterations may be simulated during online training than are used in offline training. For example, the machine learning models may be used to continue attempting to change tires on car wheels and may further improve the robot's ability to perform the task (e.g., without being controlled by a teleoperator). That being said, this is not to preclude a human intervening from time to time (e.g., if the robot system 102 gets stuck, a human may teleoperate), while still constituting a robot that is controlled without teleoperation from humans. In some cases, pre-training on a given task may expedite and make more generalizable training on a different set of similar tasks. Training the machine learning models (e.g., one or more machine learning models discussed in connection with FIG. 2 or FIG. 4) may include exploring actions that are different from actions performed via the teleoperation system 104 (e.g., actions determined by teleoperators). The robot system 102 may determine, based on a reinforcement learning policy, an action that is different from an action indicated by the plurality of records generated via teleoperation. For example, the reinforcement learning model may use a random variable to introduce variations into the actions indicated by teleoperator records. The robot system 102 may perform the action determined via the reinforcement learning policy. In response to performing the action, one or more weights of one or more machine learning models (e.g., of FIG. 2 or FIG. 4) may be adjusted. The computing system may store the one or more trained machine learning models in memory.

Figure 2:
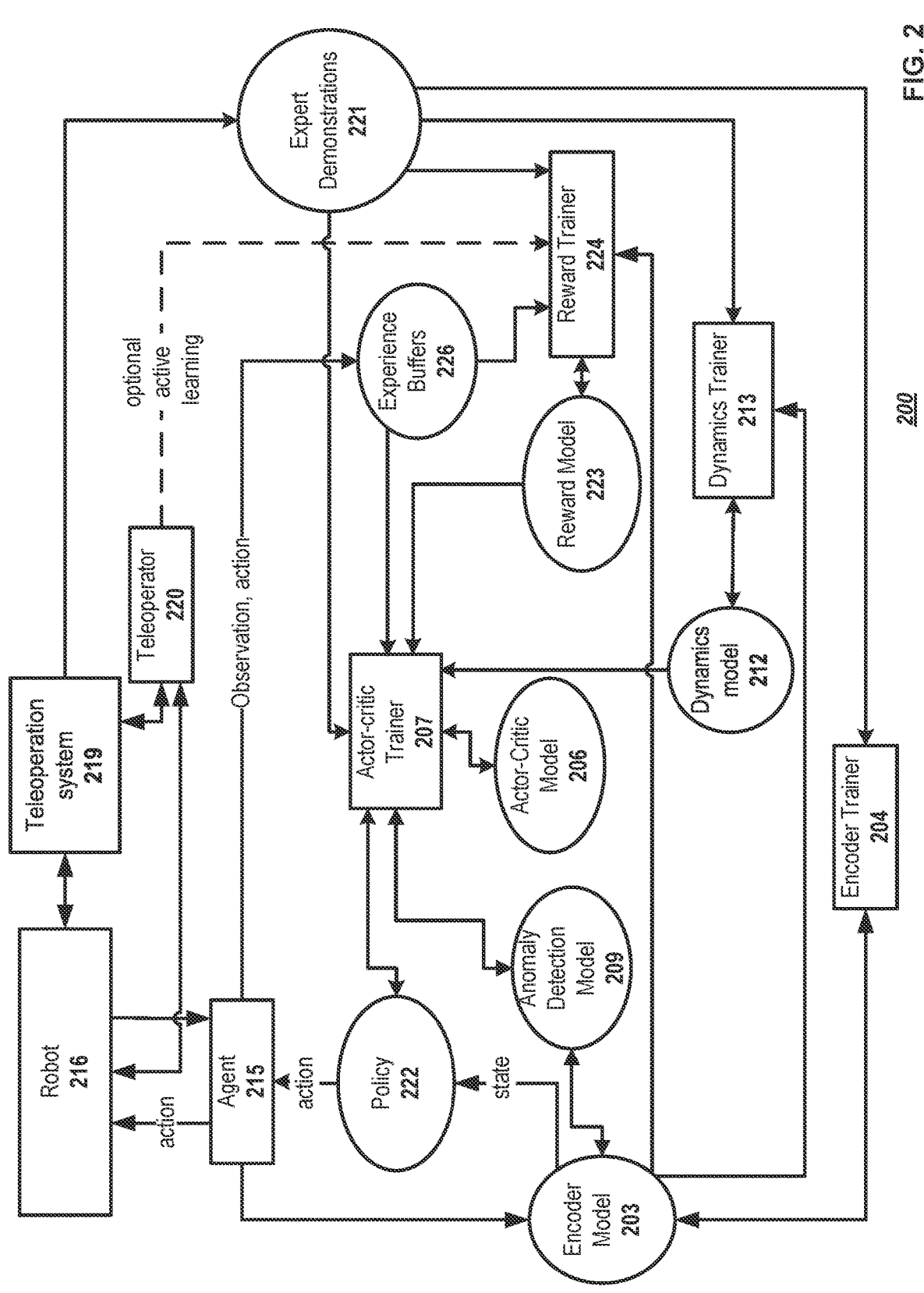
FIG. 2 shows an example machine learning system for training robots, in accordance with some embodiments.

FIG. 2 shows an additional example of a system for using machine learning to train a robot (e.g., the robot system 102) to perform a task. One or more components shown in FIG. 2 may be implemented by the robot system 102, the teleoperation system 104, or the server 106 described above in connection with FIGS. 1A-1B.

The system 200 may include a robot 216. The robot 216 may include any component of the robot system 102 discussed above in connection with FIGS. 1A-1B. The robot may be an anthropomorphic robot (e.g., with legs, arms, hands, or other parts), like those described in the application incorporated by reference. The robot may be an articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robots. The robot 216 may include one or more cameras, joints, servomotors, stepper motors, pneumatic actuators, or any other component discussed in U.S. patent application Ser. No. 16/918, 999, filed 1 Jul. 2020, titled "Artificial Intelligence-Actuated Robot," which is incorporated herein by reference in its entirety. The robot 216 may communicate with the agent 215, and the agent 215 may be configured to send actions determined via the policy 222. The policy 222 may take as input the state (e.g., a vector representation generated by the encoder model 203) and return an action to perform.

The robot 216 may send sensor data to the encoder model 203, e.g., via the agent 215. The encoder model 203 may take as input the sensor data from the robot 216. The encoder model 203 may use the sensor data to generate a vector representation (e.g., a latent space embedding) indicating the state of the robot. The encoder model 203 may be trained via the encoder trainer 204. The encoder model may use the sensor data to generate a latent space embedding (e.g., a vector representation) indicating the state of the robot or the environment around the robot periodically (e.g., 30 times per second, 10 times per second, every two seconds, etc.). A latent space embedding may indicate a current position or state of the robot (e.g., the state of the robot after performing an action to turn a door handle. A latent space embedding may reduce the dimensionality of data received from sensors. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data to a vector in a latent space embedding (e.g., a space between 10 and 2000 dimensions in some embodiments). Distance between a first space embedding and a second space embedding may preserve the relative dissimilarity between the state of a robot associated with the first space embedding and the state of a robot (which may be the same or a different robot) associated with the second space embedding.

The anomaly detection model 209 may receive vector representations from the encoder model 203 and determine whether each vector representation is anomalous or not. Although only one encoder model 203 is shown in FIG. 2, there may be multiple encoder models. A first encoder model may send latent space embeddings (e.g., vectors in such spaces) to the anomaly detection model 209 and a second encoder model may send space embeddings to other components of the system 200.

The dynamics model 212 may be trained by the dynamics trainer 213 to predict a next state given a current state and action that will be performed in the current state. The dynamics model may be trained by the dynamics trainer 213 based on data from expert demonstrations (e.g., performed by the teleoperator).

The actor-critic model 206 may be a reinforcement learning model. The actor-critic model 206 may be trained by the actor-critic trainer 207. The actor-critic model 206 may be used to determine actions for the robot 216 to perform. For example, the actor-critic model 206 may be used to adjust the policy by changing what actions are performed given an input state.

The actor-critic model 206 and the encoder model 203 may be configured to train based on outputs generated by each model 206 and model 203. For example, the system 200 may adjust a first weight of the encoder model 203 based on an action determined by a reinforcement learning model (e.g., the actor-critic model 206). Additionally or alternatively, the system 200 may adjust a second weight of the reinforcement learning model (e.g., the actor-critic model 206) based on the state (e.g., a latent space embedding) generated via the encoder model 203.

The reward model 223 may take as input a state of the robot 216 (e.g., the state may be generated by the encoder model 203) and output a reward. The robot 216 may receive a reward for completing a task or for making progress towards completing the task. The output from the reward model 223 may be used by the actor-critic trainer 207 and actor-critic model 206 to improve ability of the model 206 to determine actions that will lead to the completion of a task assigned to the robot 216. The reward trainer 224 may train the reward model 223 using data received via the teleoperation system 219 or via sampling data stored in the experience buffers 226. The teleoperation system 219 may be the teleoperation system 104 discussed above in connection with FIGS. 1A-1B. In some embodiments, the system

200 may adjust a weight or bias of the reinforcement learning model (e.g., the actor-critic model 206), such as a deep reinforcement learning model, in response to determining that a latent space embedding (e.g., generated by the encoder model 203) corresponds to an anomaly. Adjusting a weight of the reinforcement model may reduce a likelihood of the robot of performing an action that leads to an anomalous state.

The experience buffers 226 may store data corresponding to actions taken by the robot 216 (e.g., actions, observations, and states resulting from the actions). The data may include records generated via teleoperation as described above in connection with FIGS. 1A-1B. The data may be used to determine rewards and train the reward model 223. Additionally or alternatively, the data stored by the experience buffers 226 may be used by the actor-critic trainer to train the actor-critic model 206 to determine actions for the robot 216 to perform. The teleoperation system 219 may be used by the teleoperator 220 to control the robot 216 (e.g., as discussed above in connection with FIGS. 1A-1B). The teleoperation system 219 may be used to record demonstrations of the robot performing the task. The demonstrations may be used to train the robot 216 and may include sequences of observations generated via the robot 216 (e.g., cameras, touch sensors, sensors in servomechanisms, or other parts of the robot 216).

Figure 3:
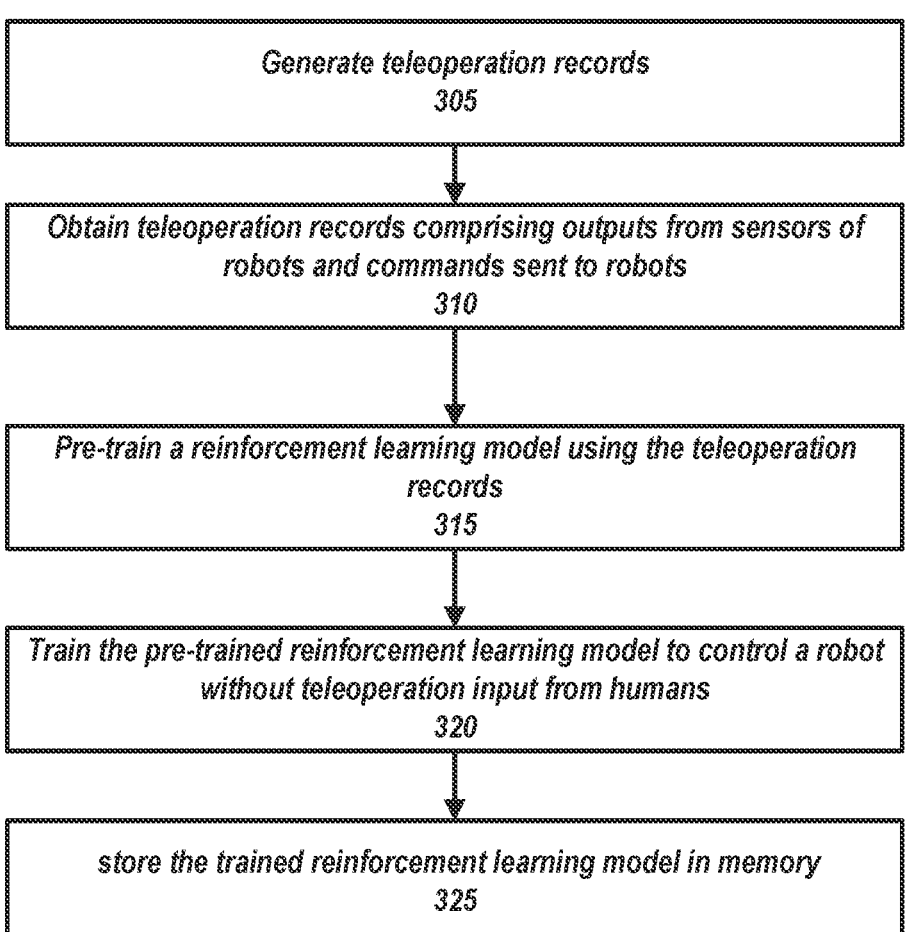
FIG. 3 shows an example flowchart of the actions involved in using a teleoperation system and machine learning to train robots, in accordance with some embodiments.

FIG. 3 shows an example flowchart of the actions involved in using a teleoperation system and machine learning to train robots. For example, process 300 may represent the actions taken by one or more devices shown in FIGS. 1-2 or FIG. 5. At 305, computing system 100 (e.g., using one or more components in system 100 (FIG. 1A) or computing system 500 via I/O interface 550 and/or processors 510a-510n (FIG. 5)) may generate teleoperation records. The teleoperation system 104 may be used to control the robot system 102 and may provide feedback (e.g., video, sound, haptic feedback, etc.) to a teleoperator as described above in connection with FIGS. 1A-1B.

At 310, robot system 102 (e.g., using one or more components in system 100 (FIG. 1A) and/or computing system 500 via one or more processors 510a-510n and system memory 520 (FIG. 5)) may obtain teleoperation records. The teleoperation records may have been generated via one or more humans teleoperating one or more robots (e.g., as in 305 above). The teleoperation records may include outputs from sensors of the one or more robots. The output may indicate states of the robots or environments surrounding the robots. The teleoperation records may include commands to the one or more robots. The commands may have been generated based on the sensor outputs or based on teleoperation inputs made in response to the sensor outputs. The sensor output may include image data generated by a camera of the robot. Additionally or alternatively, the sensor output may include an indication of a position of one or more components of the robot (e.g., a position of an arm, leg, body, wheel, tool, or other part).

At 315, robot system 102 (e.g., using one or more components in system 100 (FIG. 1A) and/or computing system 500 via one or more processors 510a-510n, I/O interface 550, and/or system memory 520 (FIG. 5)) pre-trains one or more machine learning models (e.g., one or more machine learning models described in FIG. 2 or FIG. 4) using the teleoperation records. The pre-training may adjust weights of the reinforcement learning model such that actions selected via the reinforcement learning model are more likely to resemble actions or commands indicated by the teleoperation records.

Figure 4:
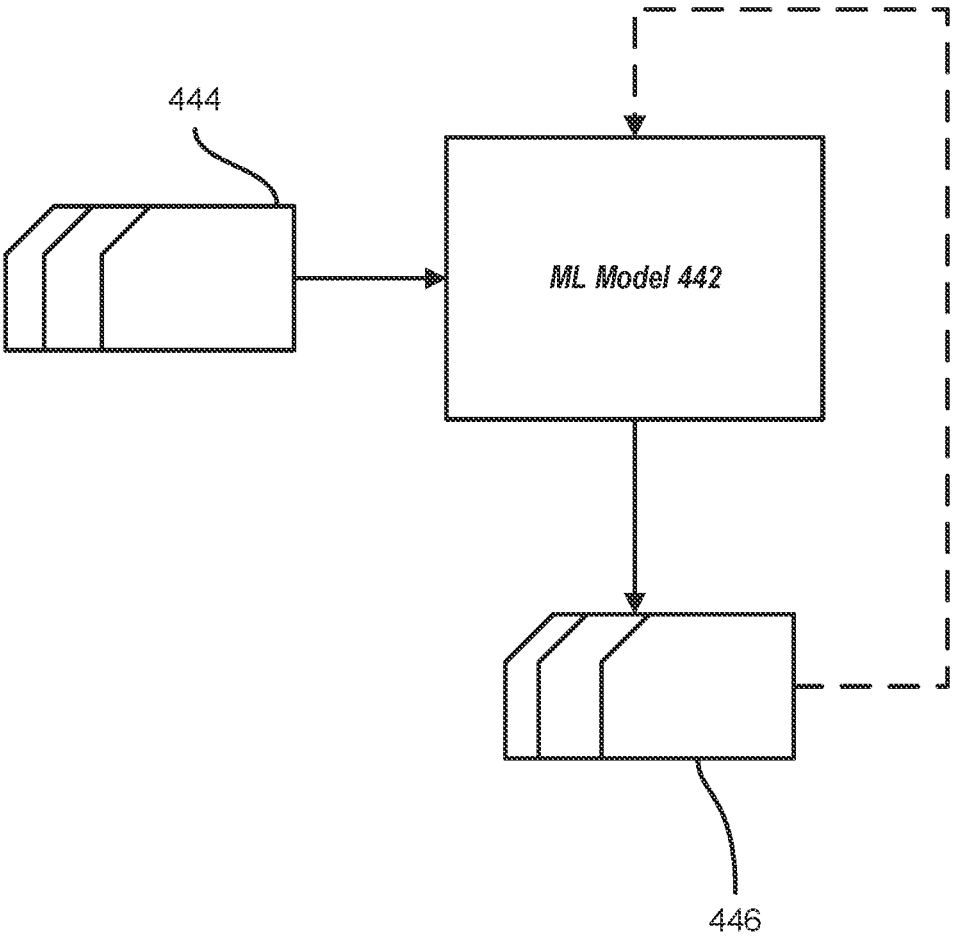
FIG. 4 shows an example machine learning model, in accordance with some embodiments.

At 320, robot system 102 (e.g., using one or more components in system 100 (FIG. 1A) and/or computing system 500 via one or more processors 510a-510n (FIG. 5)) may train the pre-trained machine learning models (e.g., one or more machine learning models described in FIG. 2 or FIG. 4). Training may include adjusting the weights of the pre-trained machine learning models to maximize a reward function or minimize a loss function (or more generally, optimize an objective function) associated with the machine learning models.

At 325, robot system 102 (e.g., using one or more components in system 100 (FIG. 1A) and/or computing system 500 (FIG. 5)) may store the trained reinforcement learning model in memory.

It is contemplated that the actions or descriptions of FIG. 3 may be used with any other embodiment of this disclosure. In addition, the actions and descriptions described in relation to FIG. 3 may be done in alternative orders or in parallel to further the purposes of this disclosure. For example, each of these actions may be performed in any order, in parallel, or simultaneously to reduce lag or increase the speed of the system or method, none of which is to suggest that any other description is limiting. Furthermore, it should be noted that any of the devices or equipment discussed in relation to FIGS. 1-5 could be used to perform one or more of the actions in FIG. 3.

One or more models discussed above may be implemented (e.g., in part), for example, as described in connection with the machine learning model 442 of FIG. 4. With respect to FIG. 4, machine learning model 442 may take inputs 444 and provide outputs 446. In one use case, outputs 446 may be fed back to machine learning model 442 as input to train machine learning model 442 (e.g., alone or in conjunction with user indications of the accuracy of outputs 446, labels associated with the inputs, or with other reference feedback and/or performance metric information). In another use case, machine learning model 442 may update its configurations (e.g., weights, biases, or other parameters) based on its assessment of its prediction (e.g., outputs 446) and reference feedback information (e.g., user indication of accuracy, reference labels, or other information). In another example use case, where machine learning model 442 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 442 may be trained to generate results (e.g., response time predictions, sentiment identifiers, urgency levels, etc.) with better recall, accuracy, and/or precision.

In some embodiments, the machine learning model 442 may include an artificial neural network. In such embodiments, machine learning model 442 may include an input layer and one or more hidden layers. Each neural unit of the machine learning model may be connected with one or more other neural units of the machine learning model 442. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 442 may be self-learning or trained, rather than explicitly programmed, and may perform significantly better in certain areas of problem solving, as compared to computer programs that do not use machine learning. During training, an output layer of the machine learning model 442 may correspond to a classification, and an input known to correspond to that classification may be input into an input layer of machine learning model during training. During testing, an input without a known classification may be input into the input layer, and a determined classification may be output. For example, the classification may be an indication of whether an action is predicted to be completed by a corresponding deadline or not. The machine learning model 442 trained by the ML subsystem 114 may include one or more latent space embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 442 may be structured as a factorization machine model. The machine learning model 442 may be a non-linear model and/or supervised learning model that can perform classification and/or regression. For example, the machine learning model 442 may be a general-purpose supervised learning algorithm that the system uses for both classification and regression tasks. Alternatively, the machine learning model 442 may include a Bayesian model configured to perform variational inference, for example, to predict whether an action will be completed by the deadline. The machine learning model 442 may be implemented as a decision tree and/or as an ensemble model (e.g., using random forest, bagging, adaptive booster, gradient boost, XGBoost, etc.).

Figure 5:
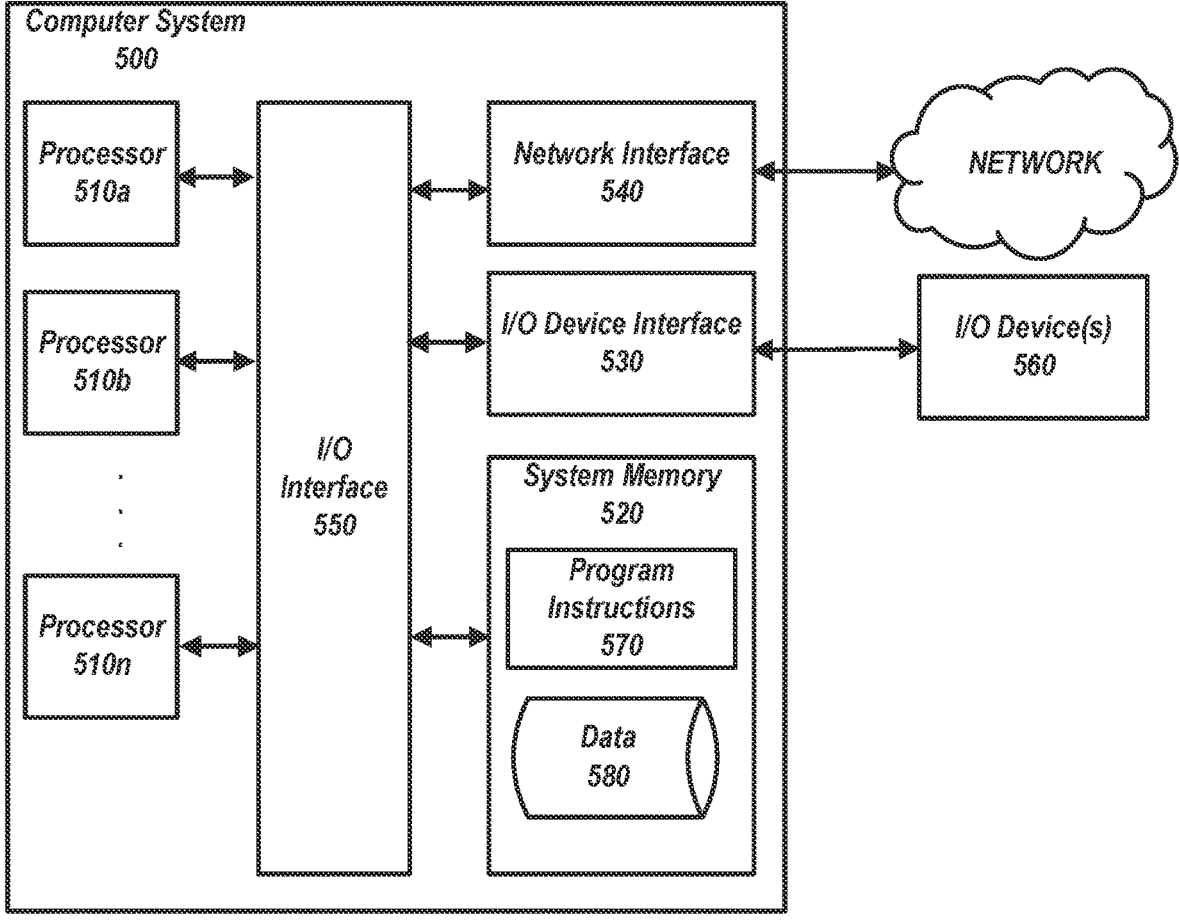
FIG. 5 shows an example computing system that may be used in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computing system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computing system 500 through a wired or wireless connection. I/O devices 560 may be connected to computing system 500 from a remote location. I/O devices 560 located on remote computer system, for example, may be connected to computing system 500 via a network and network interface 540.

Network interface 540 may include a network adapter that provides for connection of computing system 500 to a network. Network interface 540 may facilitate data exchange between computing system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 500 or multiple computer systems 500 configured to host different portions or instances of embodiments. Multiple computer systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Additionally, as used in the specification "a portion," refers to a part of, or the entirety of (i.e., the entire portion), a given item (e.g., data) unless the context clearly dictates otherwise. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing" "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flow-charts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

Embodiment 1: An embodiment of a method comprising: obtaining, with a computer system, a plurality of records of one or more humans teleoperating one or more robots, the plurality of records comprising: outputs from sensors of the one or more robots indicative of states and environments of the one or more robots, and commands to the one or more robots, wherein the commands are generated based on teleoperation inputs obtained from humans upon being presented with the outputs; training, with the computer system, a reinforcement-learning model on the plurality of records to mimic the commands to the one or more robots given new inputs from the sensors of the one or more robots, or pre-training a reinforcement-learning model to control a robot without teleoperation from humans; and storing, with the computer system, a trained reinforcement-learning model in memory.

Embodiment 2: The method of any of the preceding embodiments, further comprising re-training, with the computer system, the trained reinforcement-learning model to control a robot without teleoperation from humans; and storing, with the computer system, the re-trained reinforcement-learning model in memory, wherein training the reinforcement learning model comprises: determining associations between actions and rewards indicated in the plurality of records; and adjusting one or more weights of the reinforcement learning model based on the determined associations; or wherein pre-training the reinforcement learning model comprises: determining associations between actions and rewards indicated in the plurality of records; and adjusting one or more weights of the reinforcement learning model based on the determined associations, or re-training, with the computer system, a reinforcement-learning model on the plurality of records to mimic the commands to the one or more robots given new inputs from the sensors of the one or more robots.

Embodiment 3: The method of any of the preceding embodiments, wherein the training comprises: determining, based on a reinforcement learning policy, an action that is different from an action indicated by the plurality of records; causing a first robot of the one or more robots to perform the action; and in response to causing the first robot to perform the action, adjusting one or more weights of the reinforcement learning model.

Embodiment 4: The method of any of the preceding embodiments, wherein obtaining a plurality of records comprises: causing movement, based on input received from a teleoperator, an arm of a first robot of the one or more robots; detecting, via the arm of the first robot, contact with an object; and in response to detecting contact with the object, outputting haptic feedback to the teleoperator.

Embodiment 5: The method of any of the preceding embodiments, wherein outputting haptic feedback comprises outputting vibrations via a glove that is worn by the teleoperator.

Embodiment 6: The method of any of the preceding embodiments, wherein obtaining a plurality of records comprises: causing, based on input received from a teleoperator, movement of an arm of a first robot of the one or more robots, wherein the movement is in a first direction; determining, via information from a sensor of the arm of the first robot, that the arm should not be moved further in the first direction; and in response to determining that the arm should not be moved further in the first direction, outputting feedback to the teleoperator.

Embodiment 7: The method of any of the preceding embodiments, wherein outputting feedback to the teleoperator comprises outputting a notification to a display of an augmented reality headset worn by the teleoperator.

Embodiment 8: The method of any of the preceding embodiments, wherein outputting feedback to the teleoperator comprises outputting vibrations to a device worn on a shoulder of the teleoperator.

Embodiment 9: The method of any of the preceding embodiments, wherein outputting feedback to the teleoperator comprises outputting vibrations to a control device operated by the teleoperator.

Embodiment 10: The method of any of the preceding embodiments, wherein obtaining the plurality of records comprises: receiving first input indicating movement for the robot to perform; receiving second input indicating that the first input does not satisfy one or more criteria; and in response to receiving the second input, associating the first input with a negative reward in the reinforcement-learning model.

Embodiment 11: The method of any of the preceding embodiments, wherein the instructions for obtaining a plurality of records effectuates operations further comprising: obtaining, from a plurality of cameras of a first robot of the one or more robots, video of an environment associated with the first robot and depth information associated with the video; and outputting the video on a display of a headset, wherein a first portion of the video is output to a left eye view of the headset and a second portion of the video is output to a right eye view of the headset, and wherein the depth information is overlayed on the video.

Embodiment 12: The method of any of the preceding embodiments, wherein the instructions for obtaining a plurality of records effectuates operations further comprising: obtaining an indication of a task for a first robot of the one or more robots to perform; obtaining video from a plurality of cameras of the first robot; obtaining second video information associated with a successful completion of the task; generating a visual guide indicating a plurality of actions to perform to complete the task, and locations where each action of the plurality of actions should be performed; and outputting, on a display associated with a teleoperator of the first robot, the visual guide onto the first video, wherein a first portion of the visual guide is shown in a corresponding location in the first video.

Embodiment 13: The method of any of the preceding embodiments, wherein the first portion of the video is recorded via a left-side camera of the robot and the second portion of the video is recorded via a right-side camera of the robot.

Embodiment 14: The method of any of the preceding embodiments, wherein obtaining the plurality of records comprises: outputting data corresponding to a first robot of the one or more robots on a headset display; receiving input from a teleoperator of the first robot indicating a movement for the robot to perform; and based on receiving the input from the teleoperator, outputting updated data on the headset display.

Embodiment 15: The method of any of the preceding embodiments, wherein the first robot comprises a self-driving car.

Embodiment 16: The method of any of the preceding embodiments, wherein obtaining the plurality of records comprises: obtaining task information indicating an object for a first robot of the one or more robots to manipulate; obtaining video from a plurality of cameras of the first robot, wherein the video comprises a view of the object; determining, based on inputting the video into a machine learning model that has been trained on previous recordings of teleoperators performing a task, that the object is not oriented correctly; and in response to determining that the object is not oriented correctly, outputting an image of the object in a desired orientation, wherein the image is overlayed onto the video at a location indicating where the object should be moved to by the first robot.

Embodiment 17: The method of any of the preceding embodiments, wherein the instructions for obtaining a plurality of records effectuates operations further comprising: obtaining video from a plurality of cameras of a first robot of the one or more robots; obtaining sensor information from a plurality of sensors of the first robot, wherein the sensor information comprises an indication of a position of a joint of the first robot; and outputting the video overlayed with the sensor information to a display associated with a teleoperator of the first robot.

Embodiment 18: The method of any of the preceding embodiments, wherein the sensor information further comprises: an indication of motor temperature of a motor of the first robot; and a number of hours that the first robot has been in use since the first robot was last turned off Embodiment 19: The method of any of the preceding embodiments, wherein the instructions for obtaining a plurality of records effectuates operations further comprising: obtaining video from a plurality of cameras of a first robot of the one or more robots; obtaining first sensor information indicating that one or more parts of the first robot is functioning as expected; in response to obtaining first sensor information indicating that one or more parts of the first robot is functioning as expected, outputting the video overlayed with a user interface element indicating that the one or more parts of the first robot are functioning as expected; obtaining second sensor information indicating that a portion of the first robot is not functioning as expected; and in response to obtaining the second sensor information, outputting the video overlayed with an indication of the portion of the first robot that is not functioning as expected.

Embodiment 20: The method of any of the preceding embodiments, further comprising the one or more robots, wherein each of the one or more robots comprises more than six degrees of freedom.

Embodiment 21: The method of any of the preceding embodiments, further comprising the one or more robots, wherein a first robot of the one or more robots comprises two arms, each arm of the two arms having a hand, and wherein the first robot is tendon driven, and wherein the first robot has more than 30 degrees of freedom.

Embodiment 22: A tangible, non-transitory, machine-readable medium storing instructions that, when executed by a data processing apparatus, cause the data processing apparatus to perform operations comprising those of any of embodiments 1-21.

Embodiment 23: A system comprising: one or more processors; and memory storing instructions that, when executed by the processors, cause the processors to effectuate operations comprising those of any of embodiments 1-21.

The invention claimed is:

1. A method of training robots, the method comprising:
with a robot operating under the control of a teleoperator, receiving sensor outputs from one or more sensors coupled to the robot;
receiving teleoperation inputs generated by the teleoperator;
generating commands for the robot to perform a first task based on the sensor outputs and the teleoperation inputs;
determining a state of the robot within an environment based on the sensor outputs;
outputting one or more cues to the teleoperator based on the state of the robot within the environment;
generating a first training dataset comprising at least a portion of the sensor outputs and at least a portion of the commands;
first training a machine learning model to receive robot sensor data and output robot commands using at least a portion of the first training dataset; and
controlling the robot to perform a second task using the first trained machine learning model.

2. The method of claim 1, further comprising:
generating a second training dataset from actions determined by the first trained machine learning model during controlling the robot to perform the second task; and
second training the first trained machine learning model to receive robot sensor data and output robot commands using at least a portion of the second training dataset.

3. The method of claim 2, wherein second training the first trained machine learning model using at least a portion of the second training dataset comprises training the first trained machine learning model based on a reinforcement policy.

4. The method of claim 2, wherein the first trained machine learning model comprises a reinforcement learning model, and wherein second training the first trained machine learning model comprises:
determining, based on a reinforcement policy, a first action that is different from actions indicated by the first training dataset;
causing the robot to perform the first action; and
in response to causing the robot to perform the first action, adjusting one or more weights of the reinforcement learning model.

5. The method of claim 2, wherein the second task is the same as the first task.

6. The method of claim 2, wherein the second task is different from the first task.

7. The method of claim 2, further comprising:
controlling one or more other robots to perform tasks using the second trained machine learning model.

8. The method of claim 1, wherein the commands comprise causing movement of an arm of the robot, and wherein outputting one or more cues to the teleoperator based on the state of the robot within an environment comprises:
detecting contact of the arm of the robot with an object; and
in response to detecting contact of the arm of the robot with an object, outputting haptic feedback to the teleoperator.

9. The method of claim 1, wherein the one or more cues comprise a visual representation of the environment.

10. The method of claim 1, wherein the one or more cues comprise a haptic feedback indicating interaction of the robot with an object in the environment.

11. The method of claim 1, wherein the one or more cues comprise an indication of a restriction on movement of the robot.

12. A method of training robots, the method comprising:

receiving sensor outputs from one or more sensors coupled to one or more robots;

receiving teleoperation inputs generated by a teleoperator;

generating commands for the robot to perform a first task based on the sensor outputs and the teleoperation inputs;

determining a state of the one or more robots within an environment based on the sensor outputs;

outputting one or more cues to the teleoperator based on the state of the robot within the environment;

generating a first training dataset comprising at least a portion of the sensor outputs and at least a portion of the commands;

first training a machine learning model to receive robot sensor data and output robot commands using at least a portion of the first training dataset; and controlling the one or more robots to perform a second task using the first trained machine learning model.

13. A system comprising:

a robot system comprising a robot and one or more sensors coupled to the robot;

a teleoperation system communicatively coupled to the robot system and operable to control the robot to perform one or more tasks;

a computing system comprising one or more processing units coupled to memory and one or more computer-readable storage media storing instructions that when executed by the one or more processing units cause the computing system to perform operations comprising:

receiving sensor outputs from the one or more sensors;

receiving teleoperation inputs from the teleoperation system;

generating commands for the robot to perform a first task based on the sensor outputs and the teleoperation inputs;

determining a state of the robot within an environment based on the sensor outputs;

outputting one or more teleoperation cues based on the state of the robot within the environment;

generating a first training dataset comprising at least a portion of the sensor outputs and at least a portion of the commands;

first training a machine learning model to receive robot sensor data and output robot commands using at least a portion of the first training dataset; and controlling the robot to perform a second task using the first trained machine learning model.

14. The system of claim 13, wherein the teleoperation system comprises a headset, and wherein outputting one or more teleoperation cues based on the state of the robot within the environment comprises presenting one or more visual cues on a display of the headset.

15. The system of claim 13, wherein the teleoperation system comprises a headset, and wherein outputting one or more teleoperation cues based on the state of the robot within the environment comprises outputting one or more haptic feedbacks to the glove.

16. The system of claim 13, wherein the operations further comprise:

generating a second training dataset from actions determined by the first trained machine learning model during controlling the robot to perform the second task; and second training the first trained machine learning model to receive robot sensor data and output robot commands using at least a portion of the second training dataset.

17. The system of claim 16, wherein second training the first trained machine learning model using at least a portion of the second training dataset comprises training the first trained machine learning model based on a reinforcement policy.

18. The system of claim 16, wherein the first trained machine learning model comprises a reinforcement learning model, and wherein second training the first trained machine learning model comprises:

determining, based on a reinforcement policy, an action that is different from an action indicated by the first training dataset;

causing the robot to perform the action; and in response to causing the robot to perform the action, adjusting one or more weights of the reinforcement learning model.

19. The system of claim 13, wherein the operations further comprise:

controlling one or more other robots to perform tasks using the second trained machine learning model.

20. The system of claim 13, wherein the robot comprises an arm, wherein the commands comprise causing movement of the arm, wherein the teleoperation system comprises a haptic feedback receptor, and wherein outputting one or more teleoperation cues based on the state of the robot within an environment comprises:

detecting contact of the arm with an object; and in response to detecting contact of the arm of the robot with an object, outputting a haptic feedback to the haptic feedback receptor.

* * * * *